United States Patent
Okada et al.

(10) Patent No.: US 7,301,481 B2
(45) Date of Patent: Nov. 27, 2007

(54) TYPING PRACTICE APPARATUS, TYPING PRACTICE METHOD, AND TYPING PRACTICE PROGRAM

(75) Inventors: Kazuo Okada, Tokyo (JP); Masaki Matsuno, Tokyo (JP)

(73) Assignee: Aruze Corp., Tokyo (JP)

( * ) Notice: Subject to any disclaimer, the term of this patent is extended or adjusted under 35 U.S.C. 154(b) by 167 days.

(21) Appl. No.: 11/165,323

(22) Filed: Jun. 24, 2005

(65) Prior Publication Data

US 2005/0285760 A1    Dec. 29, 2005

(30) Foreign Application Priority Data

Jun. 25, 2004 (JP) .............................. 2004-187975
Apr. 14, 2005 (JP) .............................. 2005-116760

(51) Int. Cl.
*H03M 11/00* (2006.01)

(52) U.S. Cl. ................... 341/20; 434/233; 84/470 R; 702/150

(58) Field of Classification Search ................ 341/20, 341/22; 345/172, 168; 434/233; 84/470 R; 702/150

See application file for complete search history.

(56) References Cited

U.S. PATENT DOCUMENTS

| 4,465,477 | A |   | 8/1984  | AvGavaar |
| 4,909,739 | A | * | 3/1990  | Ladner et al. ............ 434/233 |
| 5,571,020 | A | * | 11/1996 | Troudel ................... 434/233 |
| 5,581,484 | A | * | 12/1996 | Prince .................... 702/150 |
| 5,655,910 | A | * | 8/1997  | Troudel ................... 434/233 |
| 6,089,872 | A | * | 7/2000  | Mayhue et al. ........... 434/233 |
| 6,380,470 | B1| * | 4/2002  | Fujiwara et al. .......... 84/470 R |

FOREIGN PATENT DOCUMENTS

| GB | 2 115 352 A | 9/1983 |
| GB | 2 239 428 A | 7/1991 |
| JP | 61-13276    | 1/1986 |
| JP | 2002-268534 | 9/2002 |

OTHER PUBLICATIONS

European Search Report dated Aug. 11, 2005.

* cited by examiner

*Primary Examiner*—Albert K. Wong
(74) *Attorney, Agent, or Firm*—McGinn IP Law Group PLLC

(57) ABSTRACT

A finger detector is worn on a finger of a player. When a key on a keyboard is pressed down, a pressure sensor of the finger detector sends a pressure detection signal to a PC main body, and the finger used to press down the key is detected based on the signal. When it is determined that an improper finger is used to press down the key, a beep sound is generated from a speaker.

13 Claims, 8 Drawing Sheets

FIG. 4A

| FINGER DETECTOR NUMBER | FINGER |
|---|---|
| 1 | LEFT – THUMB |
| 2 | LEFT – INDEX FINGER |
| 3 | LEFT – MIDDLE FINGER |
| 4 | LEFT – RING FINGER |
| 5 | LEFT – LITTLE FINGER |
| 6 | RIGHT – THUMB |
| 7 | RIGHT – INDEX FINGER |
| 8 | RIGHT – MIDDLE FINGER |
| 9 | RIGHT – RING FINGER |
| 10 | RIGHT – LITTLE FINGER |

FIG. 4B

| KEY | FINGER |
|---|---|
| A | LEFT – LITTLE FINGER |
| B | RIGHT – INDEX FINGER |
| C | LEFT – INDEX FINGER |
| D | LEFT – MIDDLE FINGER |
| E | LEFT – MIDDLE FINGER |
| F | LEFT – INDEX FINGER |
| G | LEFT – INDEX FINGER |
| ⋮ | ⋮ |

TYPING PRACTICE APPARATUS, TYPING PRACTICE METHOD, AND TYPING PRACTICE PROGRAM

CROSS REFERENCE TO RELATED APPLICATION

This application is based upon and claims the benefit of priority from the prior Japanese Patent Applications No. 2004-187975, filed Jun. 25, 2004 and No. 2005-116760, filed Apr. 14, 2005, the entire contents of which are incorporated herein by reference.

BACKGROUND OF THE INVENTION

1. Field of the Invention

The present invention relates to a typing practice apparatus, a typing practice method, and a typing practice program, suitable for practicing typing of a computer keyboard.

2. Description of Related Art

In recent years, the frequency of using computers is increasing, and the input to the computer is generally done through a keyboard having many keys arranged thereon. However, since it is hard for beginners to remember the arrangement of the keys on the keyboard, it is not easy for beginners to smoothly do key input (hereinafter, it is called 'typing'). Practice is necessary to smoothly type to some extent, and various typing practice methods and pieces of apparatus are proposed.

For example, JP-A-2002-268534 discloses a practice method suitable for typing without seeing text prepared beforehand while a player listening to conversation, for instance. According to this method, a computer reproduces music, it has player input the lyric of the music, and it compares the inputted characters with the characters of the correct lyric to determine whether accurate input is done.

In the meantime, in view of smooth typing, it is recommended that the individual keys on a keyboard are pressed down by proper fingers. However, in the practice method described in the Reference above, the correctness of the inputted characters is simply determined, it is not determined whether the keys have been pressed down by the proper fingers, and thus the player cannot know whether typing has been done by the proper fingers. Therefore, the practice method has a problem that it is difficult to improve typing techniques.

SUMMARY OF THE INVENTION

It is an object of the invention to provide a typing practice apparatus, a typing practice method, and a typing practice program, in which typing is learned by proper fingers to efficiently improve typing techniques.

According to a first aspect of the invention, there is provided a typing practice apparatus including: an input unit on which a plurality of keys are arranged; a finger detecting unit for detecting a finger of a player used to press down a key on the input unit; a determining unit for determining whether a finger associated with the pressed key is matched with the finger detected by the finger detecting unit; and a notifying unit for notifying a determined result by the determining unit.

According to a second aspect of the invention, there is provided a typing practice method including the steps of: detecting a finger of a player used to press down a key on an input unit on which a plurality of keys are arranged; determining whether a finger associated with the pressed key is matched with the finger detected at the finger detecting step; and notifying a determined result at the determining step.

According to a third aspect of the invention, there is provided a typing practice program which cause a computer to perform the steps of: detecting a finger of a player used to press down a key on an input unit on which a plurality of keys are arranged; determining whether a finger associated with the pressed key is matched with the finger detected at the finger detecting step; and notifying a determined result at the determining step.

According to the aspects above, since it is determined whether the finger beforehand associated with the pressed key is matched with the detected finger, i.e., the finger actually used to press down the key, and the determined result is told, the player can recognize whether typing is performed by proper fingers. Therefore, the player is allowed to learn to type by proper fingers, and thus typing techniques can be efficiently improved.

BRIEF DESCRIPTION OF THE DRAWINGS

Other and further objects, features and advantages of the invention will appear more fully from the following description taken in connection with the accompanying drawings in which:

FIG. 4A is a table associating the numbers of a finger detector with individual fingers.

FIG. 4B is a table associating keys with proper fingers for pressing down the keys.

DESCRIPTION OF THE PREFERRED EMBODIMENTS

First, a typing practice apparatus of a first embodiment according to the invention will be described.

Figure 1:
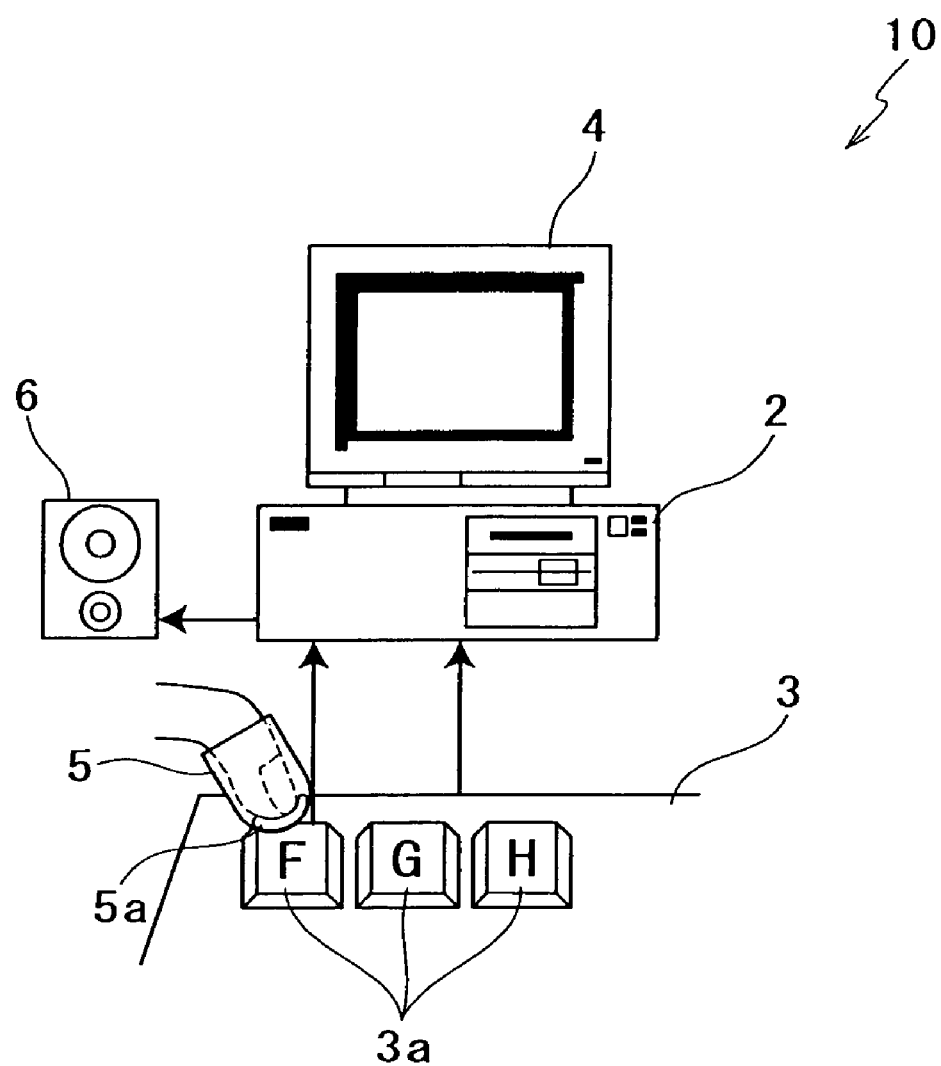
FIG. 1 schematically illustrates a typing practice apparatus of a first embodiment according to the invention.

A typing practice apparatus 10 of the embodiment is an apparatus for use in practice so that a player can smoothly type without seeing a keyboard (hereinafter, it is called 'touch typing'), which has a PC (Personal Computer) main body 2, a keyboard 3, a display 4, a finger detector 5, and a speaker 6, as shown in FIG. 1. The keyboard 3, the display 4, the finger detector 5, and the speaker 6 are connected to the PC main body 2 having an OS (Operating System) installed therein.

On the keyboard 3, many keys 3a such as 'A to Z', 'A to N (kana)', '0 to 9', periods, commas, and enter keys are arranged. For a typical input method through the keyboard 3, there are two input methods: kana typing that the keys 3a of 'A to N (kana)' are pressed down, and romaji typing that the keys 3a of 'A to Z' are pressed down.

The display 4 displays a typing practice screen (see FIG. 3) based on a display control signal from the PC main body 2. Here, the typing practice screen will be described in detail.

The typing practice screen includes a character display screen 41, a key display screen 42, and a finger display screen 43. On the right side of the finger display screen 43, the score of a typing practice game is displayed. Furthermore, in FIG. 3, although a broken line is depicted around the key image of the key display screen 42 and the finger image on the finger display screen 43, these broken lines are depicted for illustration, and they are not actually displayed on the display 4.

On the character display screen 41, two types of character strings are shown above and below in parallel with each other. The character string to be inputted is shown on the upper side, and the character string corresponding to the keys 3a to be actually pressed down by a player is shown on the lower side. The characters shown on the upper side are various types of characters such as kana and the alphabet, and the characters shown on the lower side are characters converted from the characters shown on the upper side to the character type selected by the player.

For the character types selectable by the player, there are two types, kana and the alphabet. The player selects kana as the character type between two input methods described above when the player wants to apply kana typing, whereas the player selects the alphabet as the character type when the player wants to apply romaji typing. Accordingly, the character string corresponding to the keys 3a to be pressed down by the player is shown on the lower side of the character display screen 41, and the player can smoothly type while seeing the character string on the lower side.

For example, the player selects the alphabet as the character type when the character string to be inputted is 'i-ro-ha-ni-ho-he-to (kana)'. Then, 'i-ro-ha-ni-ho-he-to (kana)' is shown on the upper side and 'IROHANIHO-HETO' is shown on the lower side (see FIG. 3). Furthermore, the player selects kana as the character type when the character string to be inputted is 'a-o-i-so-ra (kanji and kana)'. Then, 'a-o-i-so-ra (kanji and kana)' is shown on the upper side of the character display screen 41, and 'a-o-i-so-ra (kana)' is shown on the lower side.

Moreover, proverbs and music lyrics may be additionally displayed on the character display screen 41.

On the key display screen 42, a large number of the key images are displayed as similarly to the keys 3a arranged on the keyboard 3, and the image of the key 3a to be pressed down is highlighted among a large number of the key images. For example, when the key 3a to be pressed down is 'A', the key image of 'A' is flashed or clearly displayed more than the other key images among a large number of the key images shown on the key display screen 42 so as to be distinguished from the other key images. Accordingly, the player can recognize which key is the key 3a to be pressed down and the location of that key 3a.

Figure 3:
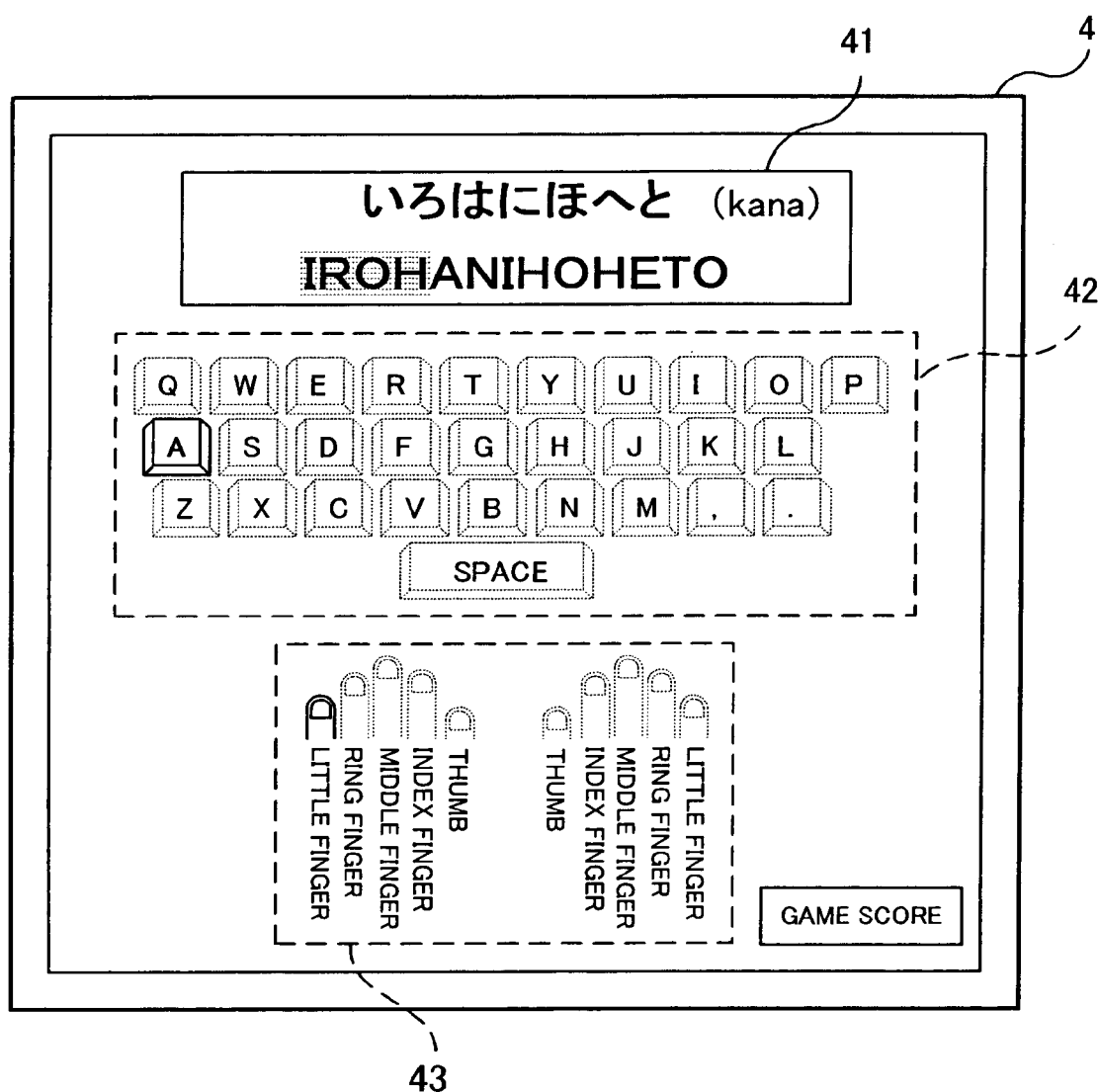
FIG. 3 is a schematic diagram illustrating a typing practice screen shown on a display of the typing practice apparatus shown in FIG. 1.

Besides, although 'A to Z' are assigned to the key images on the key display screen 42 in FIG. 3, 'A to N (kana)' may be assigned when kana typing is applied and 'A to Z' may be assigned to the key images when romaji typing is applied depending on which one of the two input methods, i.e., kana typing and romaji typing, is applied, for example.

On the finger display screen 43, the images of ten right and left fingers are displayed, and the finger image corresponding to the proper finger to press down the key 3a is highlighted among ten finger images. For example, as shown in FIG. 3, when the key image of 'A' is highlighted on the key display screen 42, the image of 'the left little finger' corresponding to the key 3a of 'A' is flashed or clearly displayed more than the other finger images so as to be distinguished from the other finger images. Accordingly, the player can recognize which finger is the proper finger to press down the key 3a.

The speaker 6 generates a sound in accordance with the result of the typing practice game. For example, when the player presses down the key 3a not corresponding to the key image highlighted on the key display screen 42 (that is, the player has pressed down a wrong key), and when the player presses down the key 3a by the finger not associated with the finger image highlighted on the finger display screen 43 (that is, the player has pressed down the key by an improper finger), a beep sound is generated. Accordingly, the player can recognize that a wrong key is pressed down and the key is pressed down by an improper finger.

The finger detector 5 is worn on each of ten fingers of the player, and has a pressure sensor 5a at the location corresponding to the fingertip. In detail, the finger detector 5 is worn on each finger so that the pressure sensor 5a is sandwiched and pressurized between the finger and the key 3a when the player presses down the key 3a. When the player presses down the key 3a, pressure is applied to the pressure sensor 5a, and a pressure detection signal by the pressure sensor 5a is sent to the PC main body 2. The numbers from one to ten are assigned to the finger detectors 5. When the PC main body 2 receives the pressure detection signal from the pressure sensor 5a of the finger detector 5, it detects the finger used to press down the key 3a based on the signal.

Furthermore, for the pressure sensor 5a, a device using a piezo-electric element is named, for example, but it is not limited to this.

Figure 2:
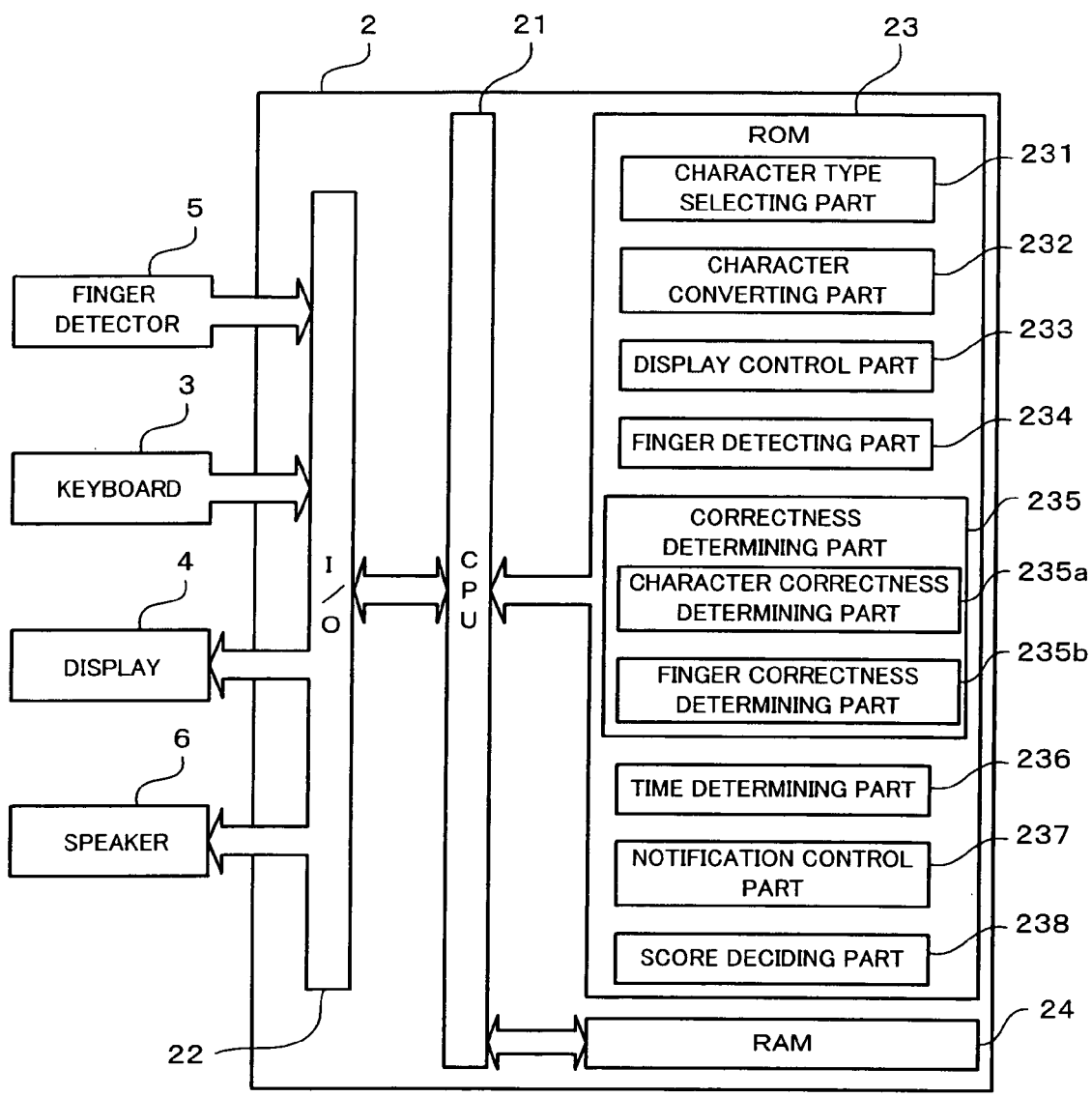
FIG. 2 is a block diagram illustrating the typing practice apparatus shown in FIG. 1.

As shown in FIG. 2, the PC main body 2 includes a CPU (Central Processing Unit) 21, an interface unit (hereinafter, it is called I/O) 22, ROM (Read Only Memory) 23, and RAM (Random Access Memory) 24. The CPU 21 is a central processing unit that conducts computations in accordance with various commands. The I/O 22 is electrically connected the keyboard 3, the display 4, the finger detector 5, and the speaker 6 to the CPU 21.

The RAM 24 is volatile read or write memory for temporary data storage in executing a program, described later, by the CPU 21, which stores the individual images for the typing practice screen (see FIG. 3), scores of the typing practice game and two correspondence tables shown in FIGS. 4A and 4B.

The correspondence table shown in FIG. 4A associates the numbers of the finger detectors 5 with ten right and left fingers. The CPU 21 receives the pressure detection signal by the pressure sensor 5a of the finger detector 5 based on information stored in a finger detecting part 234, described later, and refers to the correspondence table based on the signal to detect the finger used to press down the key 3a. For example, when the CPU 21 receives the pressure detection signal by the pressure sensor 5a of the finger detector 5 assigned with number 3, it refers to the correspondence table to detect a left middle finger as the finger used to press down the key 3a.

The correspondence table shown in FIG. 4B associates the keys 3a on the keyboard 3 with the proper fingers to press down the keys 3a. The CPU 21 decides a proper finger to press down the key 3a based on data of the key 3a to be pressed down and the correspondence table, and the finger image corresponding to the decided proper finger is highlighted on the finger display screen 43. For example, when the key 3a to be pressed down is 'A', the CPU 21 refers to the correspondence table, and highlights the finger image corresponding to a left little finger among ten finger images shown on the finger display screen 43.

The RAM 24 further stores multiple character strings to be displayed on the upper side of the character display screen 41 and a correspondence table that associates random numbers with the starting addresses of the individual character strings. The CPU 21 generates a random number when the player does the typing practice game, refers to the correspondence table, extracts the character string having the starting address matching the random number among multiple character strings stored in the RAM 24, and displays the character string on the upper side of the character display screen 41.

The ROM 23 is non-volatile read-only memory that stores a computation program for executing a flow, described later, which has a character type selecting part 231, a character converting part 232, a display control part 233, a finger detecting part 234, a correctness determining part 235, a time determining part 236, a notification control part 237, and a score deciding part 238. In the individual parts 231 to 238, information for executing each step of the program, described later, by the CPU 21 is stored.

In accordance with information stored in the character type selecting part 231, the CPU 21 displays a command that encourages the player to select one of the two character types (kana and the alphabet), that is, the character type selection command on the display 4.

In accordance with information stored in the character converting part 232, the CPU 21 converts the character string that is decided based on the random number as described above and displayed on the upper side of the character display screen 41 to the character type selected by the player in accordance with the command. For example, the player selects kana as the character type when the character string shown on the upper side of the character display screen 41 is 'a-o-i-so-ra (kana and kanji)', and then the CPU 21 converts 'a-o-i-so-ra (kana and kanji)' to 'a-o-i-so-ra (kana)'. Moreover, when the player selects the alphabet as the character type, the CPU 21 converts 'a-o-i-so-ra (kana and kanji)' to 'AOISORA'.

In accordance with information stored in the display control part 233, the CPU 21 displays the typing practice screen (see FIG. 3) on the display 4. More specifically, the CPU 21 displays the character string decided based on the random number as described above on the upper side of the character display screen 41, the character string after converted on the lower side of the character display screen 41, a large number of the key images on the key display screen 42, and the score of the typing practice game on the right side of the finger display screen 43. When the CPU 21 further determines that the key to be pressed down is matched with the key actually pressed and that the finger associated with the pressed key is matched with the finger detected through the finger detector 5 (the finger actually used to press down the key), it changes the background color of the character associated with the pressed key in the character string shown on the lower side of the character display screen 41. Accordingly, the player can recognize that what characters the player input and can type smoothly. The CPU 21 also displays a large number of the key images on the key display screen 42, highlights the image of the key 3a to be pressed down, displays ten finger images on the finger display screen 43, and highlights the proper finger to press down.

In accordance with information stored in the finger detecting part 234, the CPU 21 receives the pressure detection signal by the pressure sensor 5a of the finger detector 5, and detects the finger used to press down the key 3a based on the signal.

The correctness determining part 235 includes a character correctness determining part 235a and a finger correctness determining part 235b. In accordance with information stored in the character correctness determining part 235a, the CPU 21 determines whether the keys of characters forming the character string on the lower side of the character display screen 41 (that is, the key to be pressed down) are matched with the keys actually pressed. On the other hand, in accordance with information stored in the finger correctness determining part 235b, the CPU 21 determines whether the finger associated with the pressed key is matched with the finger detected through the finger detector 5 (that is, the finger actually used to press down the key).

In accordance with information stored in the time determining part 236, the CPU 21 determines whether a predetermined period in time has elapsed from when the character string was shown on the character display screen 41. When the CPU 21 determines that the predetermined period in time has elapsed, it determines that typing of a character string shown on the character display screen 41 at that time is failed. More specifically, when the player cannot finish typing of the character string shown on the character display screen 41 within the predetermined period in time, the player cannot continue typing of the character string.

In accordance with information stored in the notification control part 237, the CPU 21 notifies the player about the determined result determined in accordance with the correctness determining part 235. More specifically, when the CPU 21 determines that the key to be pressed down is not matched with the key actually pressed and that the finger associated with the pressed key is not matched with the finger detected through the finger detector 5 (the finger actually used to press down the key), it generates a beep sound by the speaker 6. In addition, the determined result determined by the correctness determining part 235 may be shown on the display 4.

In accordance with information stored in the score deciding part 238, the CPU 21 decides the game score based on the determined result. For example, when 10,000 points are stored as a score in the RAM 24 at the beginning of the game and the key to be pressed down is not matched with the key actually pressed, and when the finger associated with the pressed key is not matched with the finger detected through the finger detector 5 (the finger actually used to press down the key), 100 points each may be deducted.

Next, a typing practice program executed by the typing practice apparatus 10 will be described with reference to FIGS. 5 and 6.

Figure 5:
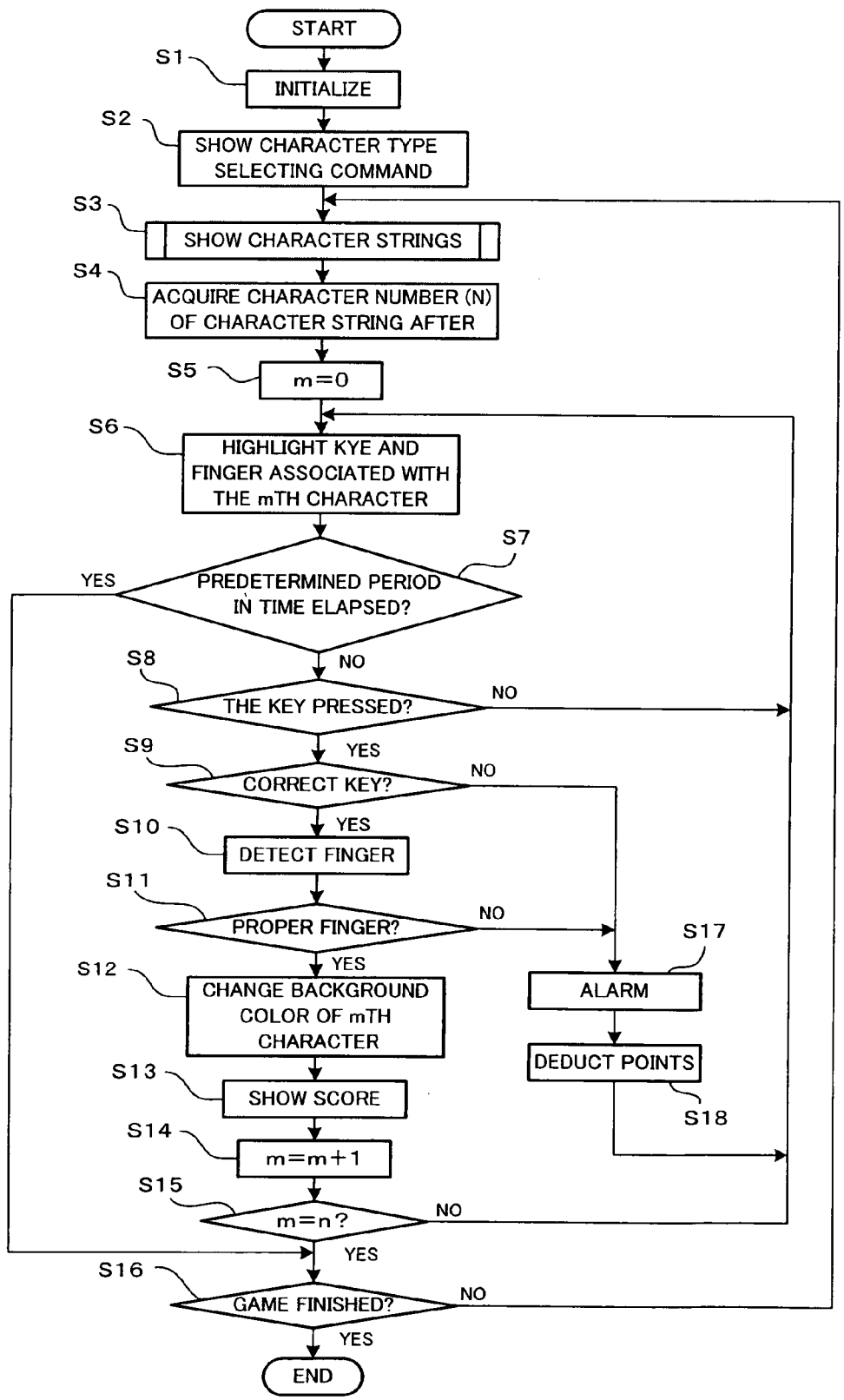
FIG. 5 is a flow chart illustrating a main routine of a program executed by the typing practice apparatus shown in FIG. 1.

First, as shown in FIG. 5, the memory contents of the RAM 24 are initialized (step [hereinafter, it is denoted as S] 1). More specifically, the following is done: data is deleted in the writable area of the RAM 24 used in the previous game, data necessary to this game is written in the write area of the RAM 24 (for example, the score obtained in the previous game), the start address of the sequence program in this game is specified, and the typing practice screen is displayed on the display 4.

Subsequently, a character type selecting command is shown on the display 4 (S2). When the player selects the character type in accordance with that command, the selected character type is stored in the RAM 24, and then character strings are shown on the character display screen 41 (see FIG. 3) (S3).

Here, a character string display routine to be done at S3 will be described in detail with reference to FIG. 6.

In the character string display routine, a single character string is first extracted from multiple character strings stored in the RAM 24 based on a random number as described above (S201). Then, the character number x of the extracted character string is acquired (S202), and after that, 0 is substituted for a given variable 1 (S203). Here, the beginning character of the character string is set as the zeroth.

Subsequently, it is determined whether the first character of the character string is the character type selected by the player in accordance with the command shown at S2 (S204). When it is determined that the first character of the character string is the character type selected by the player (S204: YES), the routine advances to S206, skipping S205. On the other hand, when it is determined that the first character of the character string is not the character type selected by the player (S204: NO), the first character is converted to the character type selected by the player (S205) After that, the value that 1 is added to the given variable 1 is substituted for the variable 1 (S206) Then, it is determined whether l=x, that is, whether the character string is converted to the character type selected by the player up to the last character of the character string (S207).

When it is determined as l=x, that is, when it is determined that the character string is converted to the character type selected by the player up to the last character of the character string (S207: YES), the character string after converting is stored in the RAM 24 (S208). Then, the character string extracted at S201 and the character string after converting stored in the RAM 24 at S208 are shown on the upper side and on the lower side, respectively, of the character display screen 41 (S209). Subsequently, the routine is finished.

On the other hand, when it is determined as l≠x, that is, when it is determined that the character string is not converted to the character type selected by the player up to the last character of the character string (S207: NO), the routine returns to S204.

Again returning to FIG. 5, the process after S3 will be described.

After the character strings are shown on the character display screen 41 at S3, the character number n of the character string shown on the lower side of the character display screen 41 (that is, the character string after converting to the selected character type) is acquired (S4). The character string handled after S4 is 'the character string after converting to the selected character type'. Then, 0 is substituted for a given variable m (S5). Here, the beginning character of the character string is set as the zeroth.

Subsequently, the key 3a associated with the mth character of the character string after converting and the proper finger to press down the key 3a are highlighted on the display 4 (S6). More specifically, the image of the key 3a associated with the mth character of the character string on the key display screen 42 (see FIG. 3) is flashed or clearly displayed more than the other key images so as to be distinguished from the other key images as well as the finger image associated with the proper finger to press down the key 3a on the finger display screen 43 is flashed or clearly displayed more than the other key images so as to be distinguished from the other key images.

Subsequently, it is determined whether a predetermined period in time has elapsed from when the character strings are shown on the character display screen 41 at S3 (S7). When it is determined that the predetermined period in time has not elapsed (S7: NO), it is determined whether the key 3a is pressed down (S8). When it is determined that the key 3a is not pressed down (S8: NO), the routine returns to S6, and it is again determined whether the predetermined period in time has elapsed. On the other hand, when it is determined that the key 3a is pressed down (S8: YES), it is determined whether the pressed key is matched with the key associated with the mth character of the character string, that is, whether the correct key 3a is pressed down (S9).

When it is determined that the correct key 3a is pressed down (S9: YES), the finger used to press down the key 3a is detected based on the pressure detection signal by the pressure sensor 5a of the finger detector 5 (S10). Then, at S10, it is determined whether the detected finger is matched with the finger associated with the pressed key 3a, that is, whether the proper finger is used to press down the key 3a (S11). When it is determined that the proper finger is use to press down the key 3a (S11: YES), the background color of the mth character of the character string after converting is changed (S12), and the game score stored in the RAM 24 is then shown on the display 4 (S13)

On the other hand, when it is determined that the wrong key 3a is pressed down (S9: NO) and that the improper finger pressed down the key 3a (S11: NO), a beep sound is made from the speaker 6 and the player receives an alarm (S17) Then, 100 points are deducted from the score stored in the RAM 24, and the deducted score is again stored in the RAM 24 (S18). After that, the routine returns to S6.

After the score is shown at S13, the value that 1 is added to a given variable m is substituted for m (S14). Then, it is determined whether m=n, that is, whether typing is completed up to the last character of the character string (S15) When it is determined as m≠n, that is, when it is determined that typing is not completed up to the last character of the character string (S15: NO), the routine returns to S6.

When it is determined as m=n, that is, when it is determined that typing is completed up to the last character of the character string (S15: YES), it is determined whether the typing practice game is finished (S16). For example, when a predetermined number of games is done as the typing for a single character string is considered as one game, or when games are done for a predetermined period in time, it is determined that the game is finished (Sl6: YES), the routine is ended. On the other hand, when it is determined that the game is not finished (S16: NO), the routine returns to S3.

After it is determined that the game is finished (S16: YES), the key 3a pressed down by the improper finger and the proper finger that would have pressed down that key 3a may be shown on the display 4 in order of more frequently failed ones, for example. Accordingly, the player can confirm a key 3a that the player is not good at pressing down by the proper finger and the finger originally used to press down that key 3a, and thus the player can efficiently improve typing techniques.

As described above, according to the typing practice apparatus 10 of the embodiment, it is determined in S11 in FIG. 5 whether the finger associated with the pressed key 3a beforehand is matched with the finger detected through the finger detector 5, i.e., with the finger actually used to press down the key 3a, and the determined result is told (S12 and S17 in FIG. 5). Therefore, the player can recognize whether the player has been able to type by proper fingers. Accordingly, the apparatus allows the player to learn to type by proper fingers, and thus typing techniques can be efficiently improved.

Further in the embodiment, it is determined in S11 in FIG. 5 whether the finger associated with the pressed key 3a beforehand is matched with the finger detected through the finger detector 5, i.e., the finger actually used to press down the key 3a, and the decided score is told based on the determined result (S13 in FIG. 5). The score told is the indicator how much the player has typed by proper fingers. Therefore, the player can recognize his or her typing technique level, and thus typing techniques can be improved more efficiently.

The finger detector 5 includes the pressure sensor 5a disposed on the fingertips of the player. In this manner, based on the fact that force is applied to the fingertip when the key 3a is pressed down, the pressure sensors 5a are arranged on the fingertips, and then the finger is detected based on the pressure detection signal by the pressure sensor 5a to highly efficiently detect the finger.

Next, a typing practice apparatus of a second embodiment according to the invention will be described. Hereinafter, the differences will be described in a typing practice apparatus 100 of the embodiment different from the typing practice apparatus 10 of the first embodiment, and therefore the same numerals and signs are assigned to the same components, omitting the description.

Figure 7:
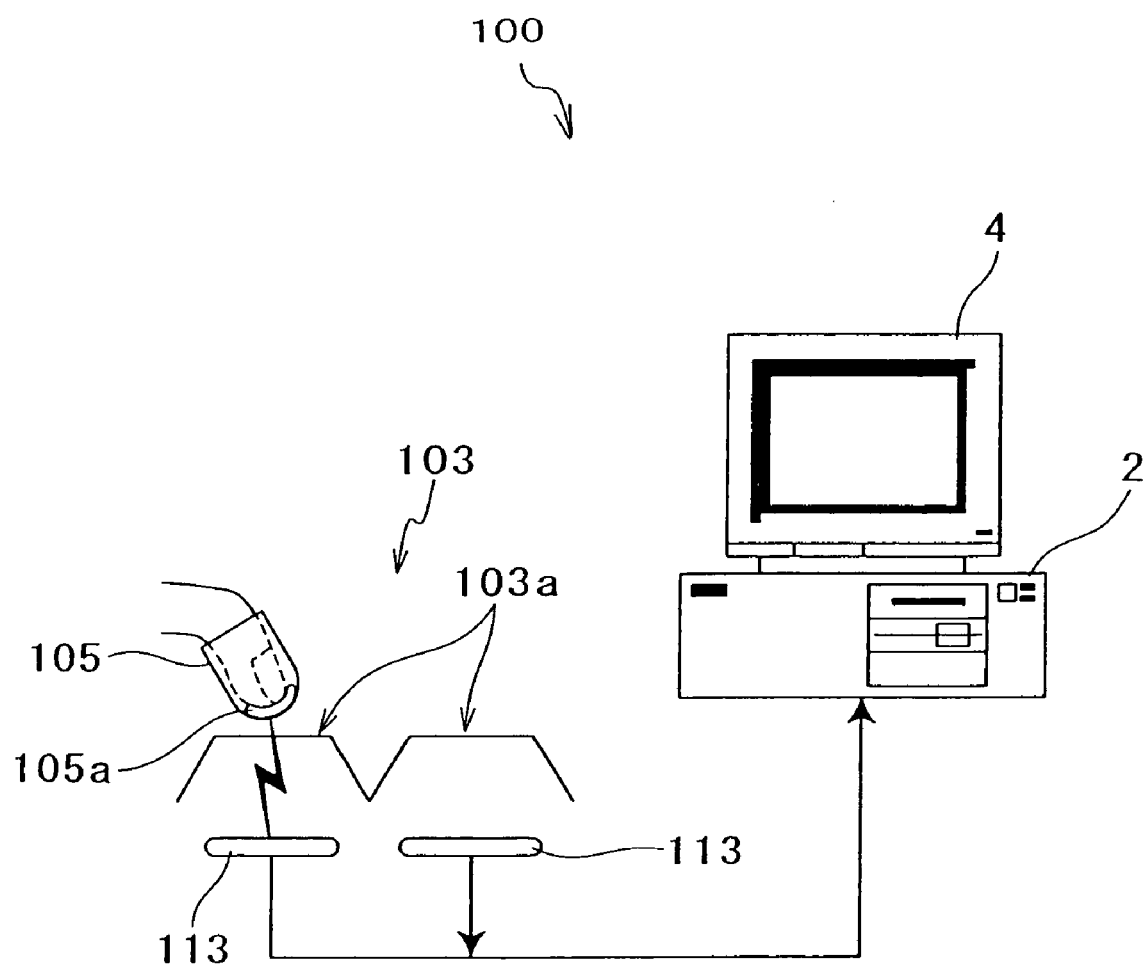
FIG. 7 is a schematic configuration diagram illustrating a typing practice apparatus of a second embodiment according to the invention.

As shown in FIG. 7, in the typing practice apparatus 100 of the embodiment, a finger detector 105 is worn on each of ten fingers of a player as similarly to the finger detector of the first embodiment, but an IC tag 105a, not the pressure sensor 5a is disposed at the location corresponding to the fingertip. Furthermore, a keyboard 103 has a tag reader 113 built therein, which can read information recorded on the IC tag 105a so as to correspond to each of keys 103a.

Figure 8:
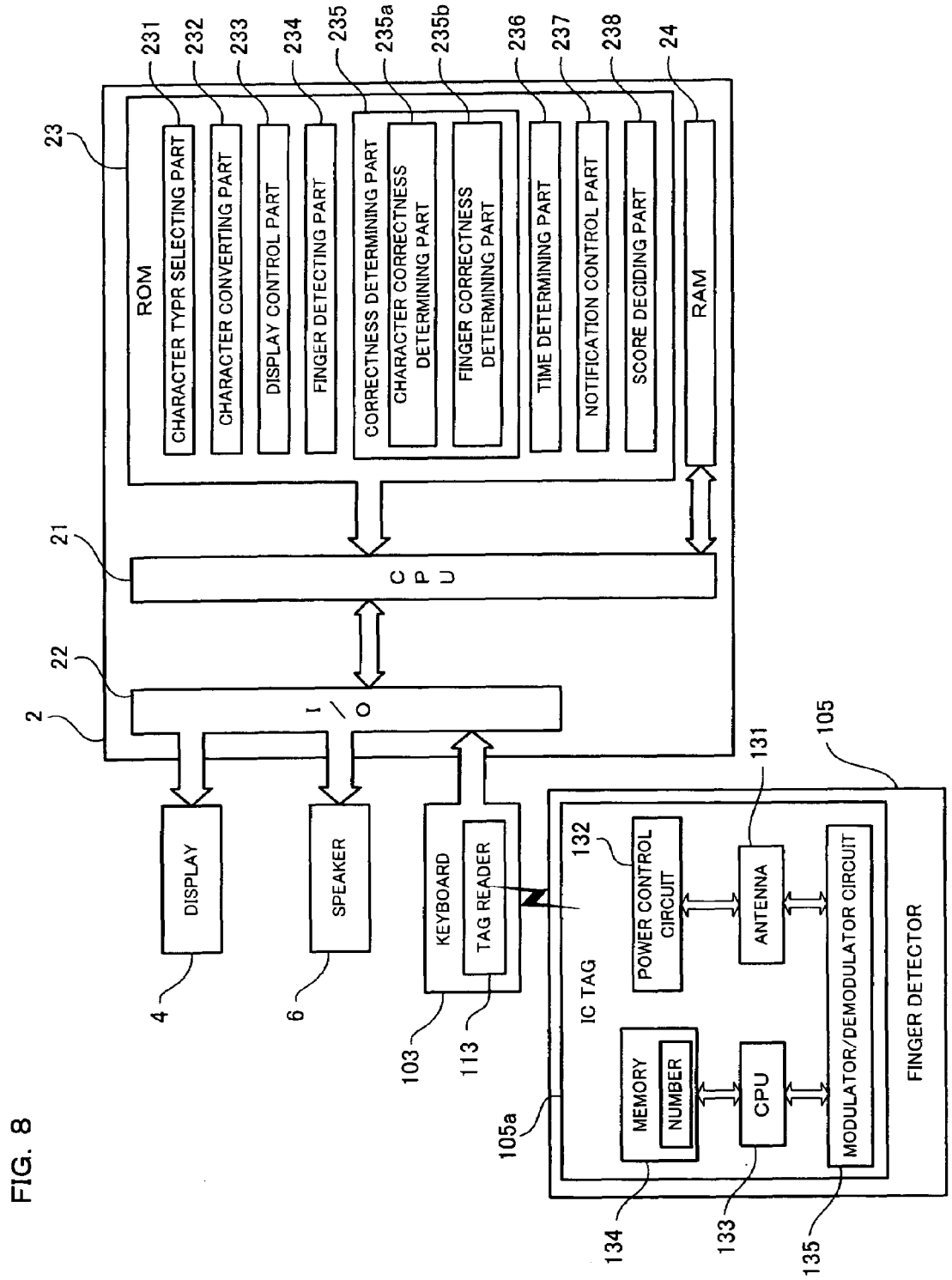
FIG. 8 is a block diagram illustrating the typing practice apparatus shown in FIG. 7.

As shown in FIG. 8, the IC tag 105a of the finger detector 105 includes an antenna 131 which sends and receives data with an antenna of a tag reader 113 (not shown), a power control circuit 132 connected to the antenna 131, a CPU 133, memory 134 connected to the CPU 133, and a modulator/demodulator circuit 133 which is connected to the antenna 131 and the CPU and modulates and demodulates data. The power control circuit 132 converts radio waves received by the antenna 131 to electric powder by electromagnetic induction, and the electric power is used for the drive electric power of the IC tag 105a. The memory 134 stores numbers corresponding to ten individual fingers (any one of one to ten), and the RAM 24 stores the correspondence table shown in FIG. 4A where these numbers are 'the numbers of the finger detectors 105'. The CPU 133 reads number data out of the memory 134 when the tag reader 113 reads information stored in the IC tag 105a. The read number data is sent from the antenna 131 to the antenna of the tag reader 131 through the modulator/demodulator circuit 135.

When the player presses down a key 103a, the tag reader 113 built in the pressed key 103a sends the signal relating to pressing down that key 103a to a PC main body 2, it reads information stored in the IC tag 105 of the finger detector 105 worn on the finger used to press down the key 103a, that is, the number data stored in the memory 134 through the antenna 131, and it sends the data to the PC main body 2. The PC main body 2 detects which key is the pressed key based on the press-down signal which has been transmitted. The PC main body 2 further detects the finger used to press down the key 103a based on the transmitted number data. More specifically, as similarly to the first embodiment, a CPU 21 detects the finger used to press down the key 103a with reference to the correspondence table shown in FIG. 4A stored in RAM 24.

Figure 6:
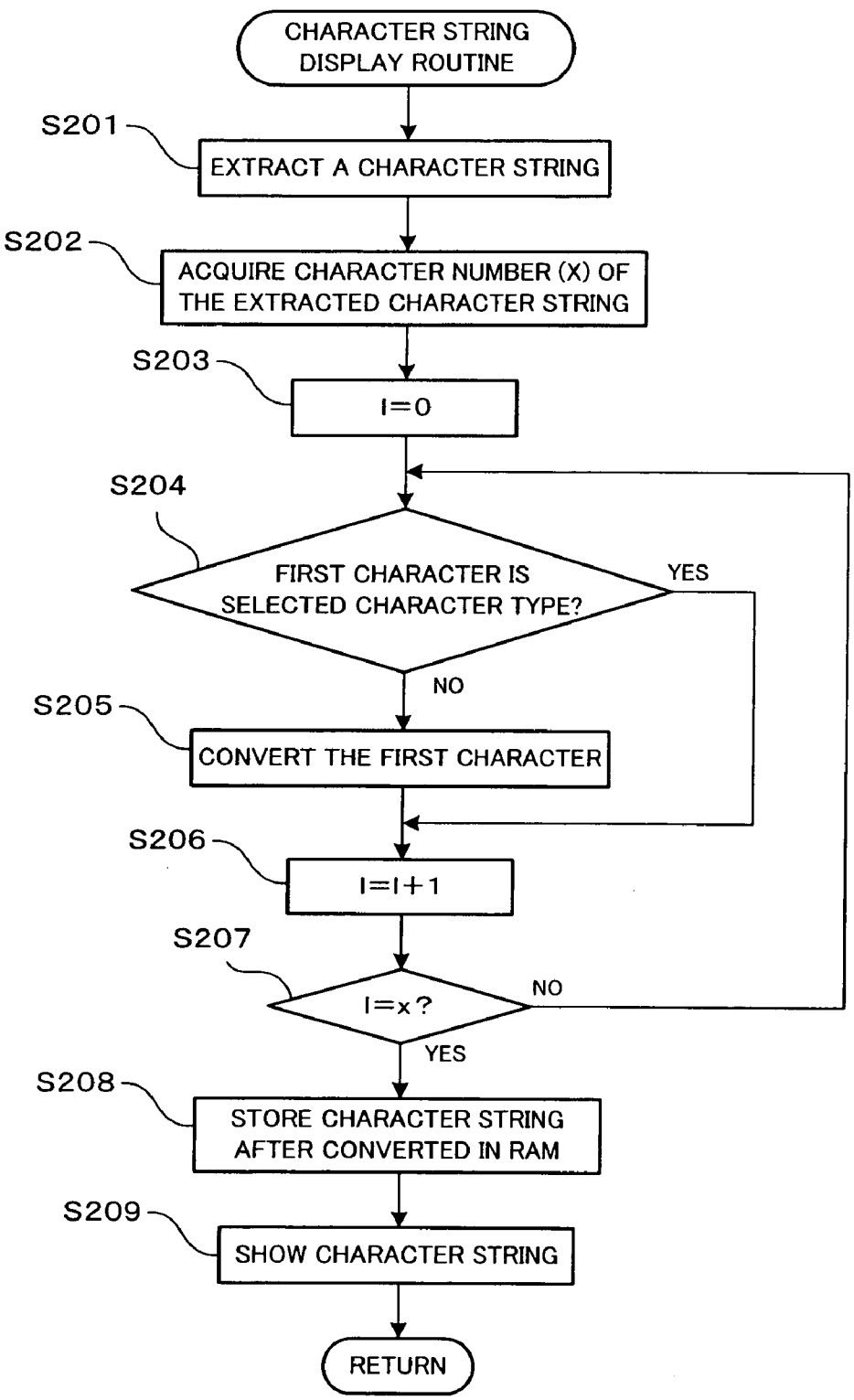
FIG. 6 is a flow chart illustrating a character string display routine in a program executed by the typing practice apparatus shown in FIG. 1.

A typing practice program executed by the typing practice apparatus 100 is almost the same as the program of the first embodiment shown in FIGS. 5 and 6, but it is different from the first embodiment in that the finger detecting step at S10 in FIG. 5 is not done based on the pressure detection signal by the pressure sensor 5a and is done based on the tag reader 113 which reads information recorded on the IC tag 105a of the finger detector 105.

As described above, according to the typing practice apparatus 100 of the embodiment, the finger detector 105 includes the IC tag 105a disposed on the fingertip of the player, and the keyboard 103 includes the tag reader 113 which can read information recorded on the IC tag 105a and is disposed so as to correspond to the key 103a. In this manner, the IC tag 105a is used which can read and write information in radio through radio waves and electromagnetic waves, and thus the finger used to press down the key 103a can be efficiently, highly accurately detected. Furthermore, since the IC tag 105a is generally very small, it rarely hampers the player from typing even when it is disposed on the fingertip and the player can smoothly practice typing.

Moreover, since the tag reader 113 is arranged so as to correspond to each of multiple keys 103a on the keyboard 103, the finger used to press down the key 103a can be detected as well as the pressed key 103a can be detected.

The finger detectors 5; 105 have the shape to be worn on each of ten fingers, but it is acceptable to be gloves wearable on right and left hands.

In the embodiments described above, the finger detectors 5; 105 including the pressure sensor 5a and the IC tag 105a are used in order to detect the finger used to press down the key, but the finger may be detected through the image. For example, it is acceptable that the images of the entire keyboard and the fingers in typing are acquired and the finger used to press down the key is detected from the acquired images. In this case, since it is unnecessary to wear the finger detectors 5; 105 on the finger, it does not hamper typing, and the player can smoothly practice typing.

In the embodiments described above, a beep sound is generated from the speaker 6 when the improper finger presses down the keys 3a; 103a, but the determined result may be told to the player by showing it on the display 4.

In the embodiments described above, the key to be pressed down is highlighted on the display 4 (see FIG. 3), but it is not limited to this. For example, an LED may be disposed on each of the keys 3a; 103a on the keyboards 3; 103 and the LED corresponding to the keys 3a; 103a to be pressed down may be lit to tell the key to be pressed down to the player.

Furthermore, in the embodiments described above, when the correct key is pressed down and the proper finger presses down the key, then the routine moves to the next input of the character. However, the routine may move to the next input of the character when one of them is successful or when both are failed.

The association of the key with the finger is not limited to that based on the correspondence table shown in FIG. 4B that illustrates general home positions for input through the keyboard, and the player may set the association. For example, the finger associated with the key of 'B' may be set to a right index finger or to a left index finger. Accordingly, the player can improve typing techniques by him or her own methods.

In addition, deciding and telling the score based on the determined result of whether the proper finger is used to press down the keys 3a; 103a may be omitted.

The typing practice program according to the invention is written read-only beforehand in the ROM 23 of the PC main body 2 in the embodiments described above. However, a program recorded on a removable record medium such as a CD may be read out as required and written in the RAM 24 or a program may be sent through an electric communication line such as the Internet and written in the RAM 24.

The typing practice program according to the invention can be distributed by recording it on a removable record medium such as DVD-ROM, CD-ROM, FD (flexible disk), and MO and a fixed record medium such as a hard disk, as well as it can be distributed through communication networks such as the Internet. For example, the typing practice program according to the invention can be applied to home video games. In this case, a record medium on which the program is recorded may be DVD-ROM, CD-ROM, FD (flexible disk), or a given record medium.

Although the above description indicates a case where a player uses Japanese and there are two input methods including kana typing and romaji typing and that character types selectable by a player are kana and the alphabet, the invention is not limited to this. For example, in a case where a player uses English, a character string in lower-case alphabet to be inputted may be shown in on the upper side of the character display screen 41 in FIG. 3, and a character string in upper-case alphabet corresponding to the keys 3a to be actually pressed down by a player may be shown on the lower side. Since, in general, each of the keys 3a has an upper-case alphabet written thereon, a player can easily find a key to be pressed, an upper-case alphabet written on which is shown on the lower side of the character display screen 41. Thus, the player can smoothly type while seeing the character string on the lower side. In other words, character types selectable by a player and character strings respectively shown on the upper and lower sides of the character display screen 41 in FIG. 3 may be variously changed in accordance with a language used by a player.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. A typing practice apparatus comprising:
    an input unit on which a plurality of keys are arranged;
    a finger detecting unit for detecting a finger of a player used to press down a key on the input unit;
    a determining unit for determining whether a finger associated with the pressed key is matched with the finger detected by the finger detecting unit;
    a notifying unit for notifying a determined result by the determining unit;
    a score deciding unit for deciding a score based on the determined results by the determining unit; and
    a score notifying unit for notifying the score decided by the score deciding unit.

2. The typing practice apparatus according to claim 1, wherein the finger detecting unit includes a pressure sensor disposed on a fingertip of the player.

3. The typing practice apparatus according to claim 1, wherein the finger detecting unit includes an IC tag disposed on a fingertip of the player, and a tag reader which can read information recorded on the IC tag and is disposed so as to correspond to a key on the input unit.

4. The typing practice apparatus according to claim 3, wherein the tag reader is disposed so as to correspond to each of the plurality of keys.

5. A typing practice method comprising:
    detecting a finger of a player used to press down a key on an input unit on which a plurality of keys are arranged;
    determining whether a finger associated with the pressed key is matched with the finger detected at the finger detecting step;
    notifying a determined result at the determining step;
    deciding a score based on the determined results; and
    notifying the score decided.

6. A programmable storage medium tangibly embodying a typing practice program of computer-readable instructions executable by a digital processing apparatus to perform a typing practice method, said method comprising:
    detecting a finger of a player used to press down a key on an input unit on which a plurality of keys are arranged;
    determining whether a finger associated with the pressed key is matched with the finger detected at the finger detecting step;
    notifying a determined result at the determining step;
    deciding a score based on the determined result; and
    notifying the score decided.

7. The typing practice apparatus according to claim 1, wherein the finger detecting unit includes a pressure sensor disposed on a fingertip of the player.

8. The typing practice apparatus according to claim 1, wherein the finger detecting unit includes an IC tag disposed on a fingertip of the player, and a tag reader which can read information recorded on the IC tag and is disposed so as to correspond to a key on the input unit.

9. The typing practice apparatus according to claim 1, further comprising:
    a character control unit for displaying a character string to be inputted and a key character string corresponding to the keys, which is to be converted to the character strings to be inputted.

10. The typing practice apparatus according to claim 9, wherein when the determining unit determines the finger is matched, the character control unit changes a background color of a character corresponding to the key for which the finger is matched, in the key character string.

11. The typing practice apparatus according to claim 1, further comprising:
    a key arrangement displaying unit for displaying a plurality of key arrangement images corresponding to an arrangement of the plurality of keys; and
    a key image control unit for highlighting an image range of a key to be pressed down among the plurality of key arrangement images.

12. The typing practice apparatus according to claim 1, further comprising:
    a finger image displaying unit for displaying finger images corresponding to fingers; and
    a finger image control unit for highlighting an image range of a finger associated with a key to be pressed down among the finger images.

13. The typing practice apparatus according to claim 1, further comprising:
    a mismatch displaying unit for notifying the key and/or the finger associated with the key when the determining unit determines the finger is not matched.

* * * * *